(12) United States Patent
Kim et al.

(10) Patent No.: US 7,599,353 B2
(45) Date of Patent: Oct. 6, 2009

(54) ETHERNET SWITCH, AND APPARATUS AND METHOD FOR EXPANDING PORT

(75) Inventors: Chan Kim, Daejeon (KR); Tae Whan Yoo, Daejeon (KR); Hyeong Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1084 days.

(21) Appl. No.: 10/739,737

(22) Filed: Dec. 17, 2003

(65) Prior Publication Data

US 2005/0002390 A1    Jan. 6, 2005

(30) Foreign Application Priority Data

Jun. 13, 2003    (KR) .................... 10-2003-0038375

(51) Int. Cl.
*H04L 12/66*    (2006.01)
(52) U.S. Cl. .................. 370/352; 370/389; 370/392; 370/401; 370/412; 709/249; 726/11
(58) Field of Classification Search ................ 370/352, 370/414, 392, 395.53, 225, 389, 401, 412; 398/71; 709/249; 726/11
See application file for complete search history.

(56) References Cited

U.S. PATENT DOCUMENTS

| | | | |
|---|---|---|---|
| 5,448,565 A | | 9/1995 | Chang et al. |
| 5,602,851 A | * | 2/1997 | Terashita et al. ............. 370/403 |
| 5,898,686 A | * | 4/1999 | Virgile ....................... 370/381 |
| 5,926,626 A | * | 7/1999 | Takeuchi et al. ............. 709/249 |
| 6,101,188 A | * | 8/2000 | Sekine et al. ................ 370/401 |
| 6,256,306 B1 | | 7/2001 | Bellenger |
| 6,373,845 B1 | * | 4/2002 | Aramaki et al. ........... 370/395.3 |
| 6,385,208 B1 | | 5/2002 | Findlater et al. |
| 6,580,712 B1 | * | 6/2003 | Jennings et al. ............. 370/392 |
| 6,661,792 B1 | * | 12/2003 | Park ........................... 370/392 |
| 6,721,319 B1 | * | 4/2004 | Amano et al. ............... 370/390 |
| 6,754,222 B1 | * | 6/2004 | Joung et al. ................. 370/412 |
| 6,904,046 B2 | * | 6/2005 | Benayoun et al. ........... 370/414 |
| 7,068,656 B2 | * | 6/2006 | Sainomoto et al. .......... 370/392 |
| 7,161,900 B2 | * | 1/2007 | Tanada ....................... 370/225 |
| 7,302,700 B2 | * | 11/2007 | Mao et al. ..................... 726/11 |
| 7,330,654 B2 | * | 2/2008 | Song et al. .................... 398/71 |
| 2004/0120326 A1 | * | 6/2004 | Yoon et al. .............. 370/395.53 |

* cited by examiner

*Primary Examiner*—Gerald Gauthier
(74) *Attorney, Agent, or Firm*—Blakely, Sokoloff, Taylor & Zafman LLP

(57) ABSTRACT

An Ethernet switch having a function of expanding a port, apparatus and method for expanding a port are provided. A receiver receives a frame including predetermined port identification information. An information detector detects the predetermined port identification information and a terminal address of a terminal connected to a sub port corresponding to the predetermined port identification information. A storage unit stores an address table including the terminal address and the predetermined port identification information. A reader reads port identification information corresponding to a destination address included in the frame from the address table. A frame transformer adds the read port identification information to the frame. An output unit outputs the frame transformed by the frame transformer to a main port connected to a sub port corresponding to the read port identification information among main ports that can be connected to at least one sub port.

17 Claims, 7 Drawing Sheets

ETHERNET SWITCH, AND APPARATUS AND METHOD FOR EXPANDING PORT

BACKGROUND OF THE INVENTION

This application claims the priority of Korean Patent Application No. 2003-38375, filed on Jun. 13, 2003, in the Korean Intellectual Property Office, the disclosure of which is incorporated herein in its entirety by reference.

1. Field of the Invention

The present invention relates to an Ethernet switch, and apparatus and method for expanding a port, and more particularly, to an Ethernet switch, and apparatus and method for expanding a single physical port to a plurality of logical ports.

2. Description of the Related Art

A conventional Ethernet switch includes a filter/transmission logic, a learning logic, and an address table. The filter/transmission logic checks a destination address of a received frame and compares the destination address with entries of the address table. When the destination address of the received frame exists in the address table and an output port corresponding to the destination address is not a port through which the frame is received, the filter/transmission logic transmits the frame to the port of the destination. When the output port corresponding to the destination address is the port through which the frame is received, the filter/transmission logic performs filtering by discarding the frame. When the address table does not include any information on the destination address, the filter/transmission logic floods the frame to all ports.

The learning logic collects a source address of the received frame and input port information and updates the address table. Each entry of the address table includes a media access control (MAC) address of a host and a port that has received a frame the most lately. The address table is updated by the learning logic and is used by the filter/transmission logic to determine on the transmission of a received frame. Each entry of the address table has a timer which indicates a time lapse used to determine when a MAC address will be discarded. Because the size of the address table within a switch is limited, the number of MAC addresses, i.e., hosts, that can be allocated to a single Local Area Network (LAN) switch is restricted.

A conventional high-speed switch does not transmit a received frame through a port through which the frame has been received. When a plurality of low-speed ports are connected to the conventional high-speed switch through an apparatus simply performing multiplexing/demultiplexing, a frame cannot be transmitted between the low-speed ports. Accordingly, when a plurality of low-speed ports are connected to a high-speed switch, a low-speed switch or a bridge for transmitting frames between the low-speed ports is required to be provided between the high-speed switch and the plurality of low-speed ports.

FIG. 1A illustrates downstream traffic flow in a conventional Ethernet Passive Optical Network (EPON). The conventional EPON includes an optical link terminal (OLT) 100, a plurality of optical network units (ONUs) 120, 122, and 124, and a splitter/coupler.

Data of a frame is formed in a variable-length packet and is transmitted (i.e., broadcast) from the OLT 100 to all of the ONUs 120, 122, and 124. Packets 110, 112, and 114 include information on the respective ONUs 120, 122, and 124 to which they are supposed to be transmitted, respectively, in a logical link Identification (LLID) field located at the front portion of a frame, separately from a MAC address. When data reaches the ONUs 120, 122, and 124, each of the ONUs 120, 122, and 124 receives a packet designated to it and discards the other packets.

FIG. 1B illustrates upstream traffic flow in a conventional EPON. In FIG. 1B, upstream traffic from ONUs 170, 172, and 174 to an OLT 150 is managed using Time Division Multiplexing (TDM). The ONUs 170, 172, and 174 transmit upstream data 160, 162, and 164, respectively, in time slots which the OLT 150 allocates to the ONUs 170, 172, and 174, respectively, using TDM so that the data 160, 162, and 164 are prevented from colliding. Like a packet in downstream traffic, a packet in upstream traffic also includes an LLID, which indicates a source ONU from which the packet is forwarded.

Frames from ONUs are transmitted to an OLT and frames from the OLT are transmitted to the ONUs through a single physical line provided between the OLT and a splitter/coupler. A downstream signal is transmitted to all of the ONUs, and an upstream signal from a certain ONU is transmitted to only the OLT without collision. To implement a bridge function for virtual, logical ports distinguished by LLIDs, the OLT is required to identify a virtual port connected to a single physical EPON line and function as a bridge. However, a conventional high-speed switch does not support virtual port identifiers, and therefore, it cannot transmit a frame through a physical port through which the frame has been received. In other words, when a conventional EPON is connected to a conventional high-speed switch, frames cannot be transmitted between ONUs.

SUMMARY OF THE INVENTION

The present invention provides an Ethernet switch for expanding a port by directly connecting a plurality of low-speed ports to a high-speed switch without using an intermediate bridge, and a method thereof.

The present invention also provides an apparatus and method for expanding a port by connecting a plurality of low-speed ports to a port of a high-speed switch without using an intermediate bridge.

According to an aspect of the present invention, there is provided an Ethernet switch including a receiver which receives a frame including port identification information, the port identification representing the sub-ports belonging to the switch port, an information detector which detects the predetermined port identification information and a terminal address of a terminal connected to a sub port corresponding to the port identification information, a storage unit which stores an address table entry including the terminal address and the port identification information, a reader which reads port identification information corresponding to a destination address included in the frame from the address table, a frame transformer which adds the read port identification information to the frame, and an output unit which outputs the frame transformed by the frame transformer to a main port leading to the sub port corresponding to the read port identification information among main ports that can be connected to at least one sub port.

According to another aspect of the present invention, there is provided a method of expanding a port. The method includes receiving frames from each port, the frame carrying sub-port information in a separate field outside the frame, detecting the received port and sub-port identification information together with the source MAC address, storing at the address table the source MAC address and the extracted port identification information, reading port identification information corresponding to the destination address included in the frame from the address table, adding the read port identification information to the frame, and outputting the frame with the read port identification information to the main port connected to a sub port corresponding to the read port identification information, among main ports that can be connected to at least one sub port.

According to still another aspect of the present invention, there is provided an apparatus for expanding a port. The apparatus includes a receiver which receives a first incoming frame from a port connected to terminals or receives a second outgoing frame including port identification information from the port connected to high-speed switch, a frame transformer which adds to the first frame the port identification information of the port from which the first frame has been received, and an output unit which outputs the first incoming frame transformed by the frame transformer to the high-speed switch or outputs the second outgoing frame to the port corresponding to the port identification information included in the second frame.

According to still another aspect of the present invention, there is provided a method of expanding a port. The method includes receiving a first incoming frame from a port connected to terminals or receives a second outgoing frame including port identification information from the port connected to high-speed switch, adding to the first frame the port identification information of the port from which the first frame has been received, and outputting the first incoming frame transformed by the frame transformer to the high-speed switch or outputs the second outgoing frame to the port corresponding to the port identification information included in the second frame.

Accordingly, since a plurality of low-speed ports are connected to a single high-speed switch without a bridge, the various functions and a large amount of memory of the high-speed switch can be shared, so that high performance can be achieved at a low cost.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Hereinafter, preferred embodiments of the present invention will be described in detail with reference to the attached drawings.

Figure 1A:
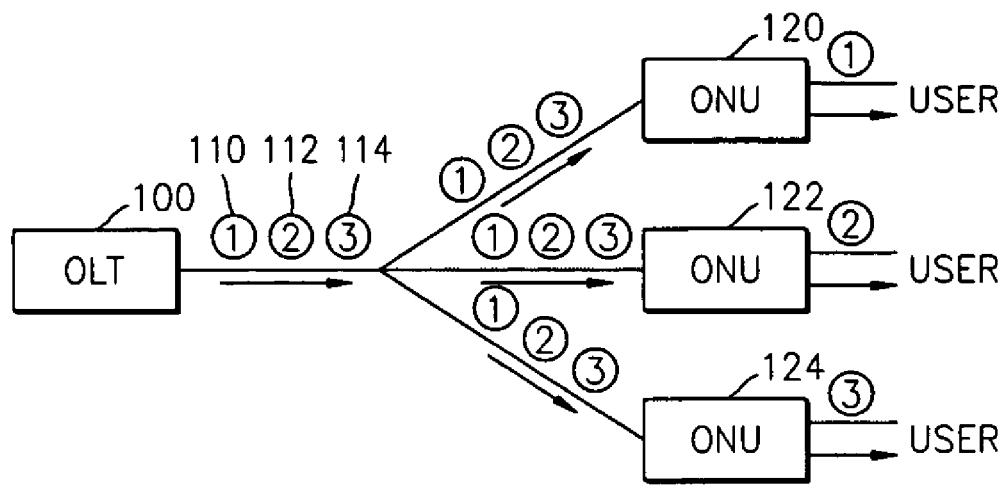
FIG. 1A illustrates downstream traffic flow in a conventional Ethernet Passive Optical Network (EPON)
Figure 1B:
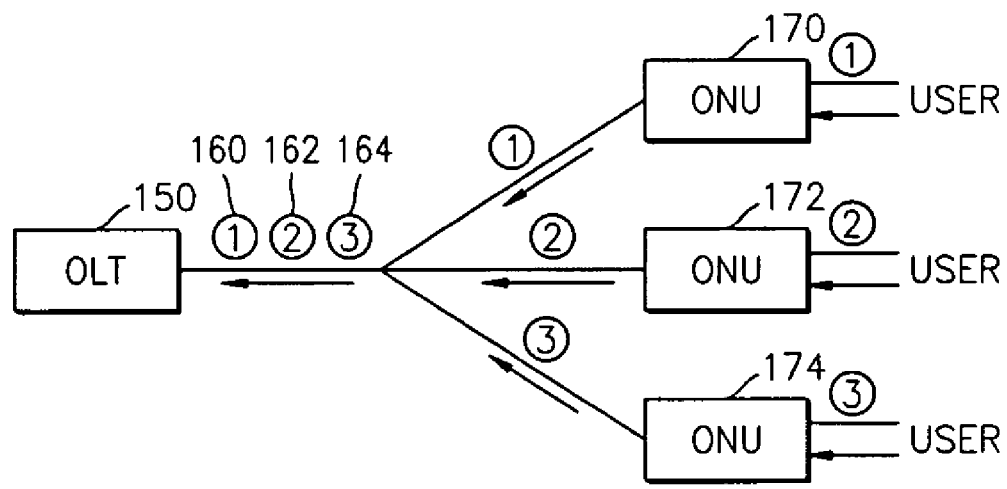
FIG. 1B illustrates upstream traffic flow in a conventional EPON.
Figure 2:
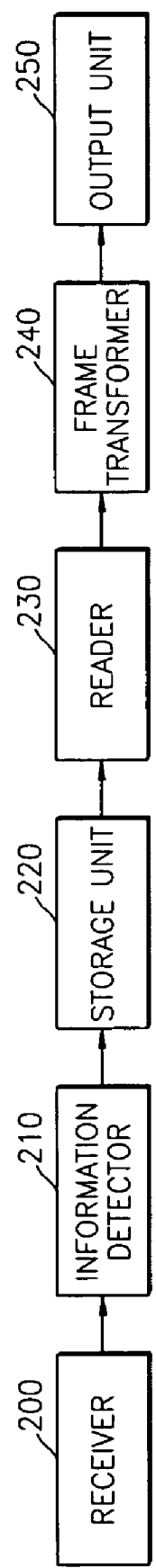
FIG. 2 is a block diagram of an Ethernet switch according to an embodiment of the present invention.

FIG. 2 is a block diagram of an Ethernet switch according to an embodiment of the present invention. The Ethernet switch includes a receiver 200, an information detector 210, a storage unit 220, a reader 230, a frame transformer 240, and an output unit 250.

Figure 5:
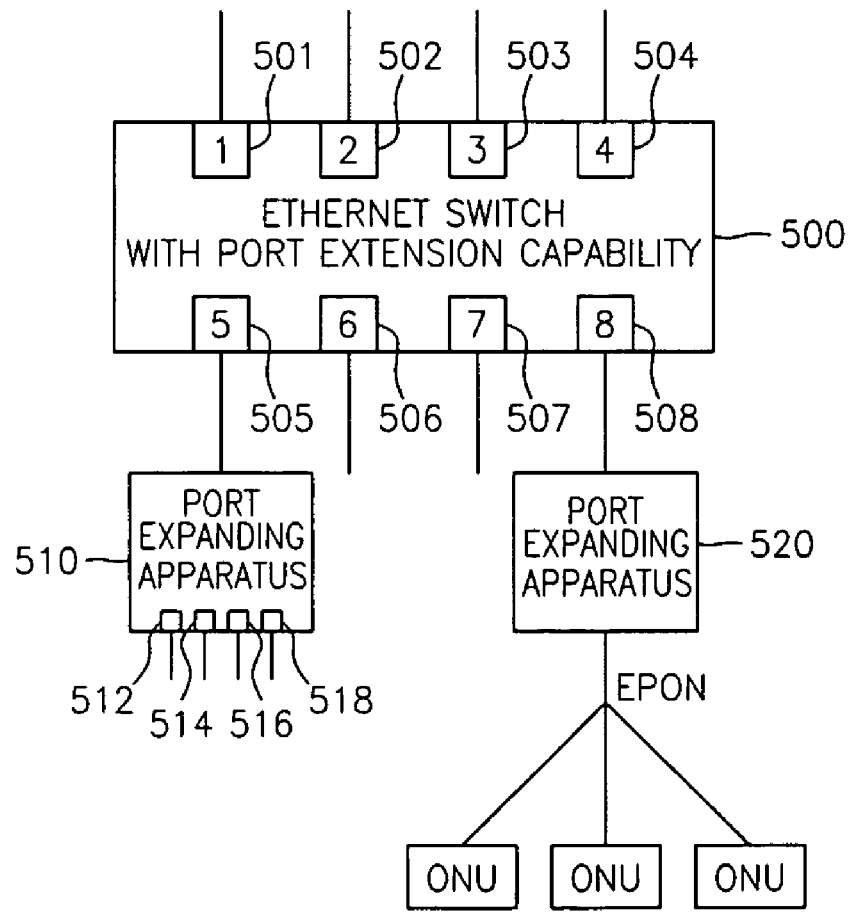
FIG. 5 shows an example of a structure in which an Ethernet switch is connected to an apparatus for expanding a port, according to the present invention with the switching having port extension capability.

The receiver 200 receives a frame (300 shown in FIG. 3A) including a predetermined port identification information field (314) through each of main ports (501 through 508 shown in FIG. 5). Each of the main ports 501 through 508 is connected to a plurality of sub ports (512, 514, 516, and 518 shown in FIG. 5). The port identification information field 314 indicates identification information of a sub port connected to a main port or logical line identification information of an optical network unit (ONU) in an Ethernet Passive Optical Network (EPON). Identification information of a sub port connected to a main port may have a unique value which is fixed physically or a logic value which is temporarily allocated by the Ethernet switch. The frame 300 including the port identification information field 314 will be described in detail later with reference to FIG. 3.

The information detector 210 detects port identification information included in the frame received by the receiver 200 and a terminal address of a terminal connected to a sub port corresponding to the port identification information. In other words, the information detector 210 recognizes the port identification information included in the received frame as an input port through which the frame has been received. Accordingly, since the Ethernet switch recognizes a single physical port as a plurality of logical ports, it can satisfy the conditions of a high-speed switch that does not transmit a frame through the port that the frame has been received through. Here, the terminal address is a media access control (MAC) address uniquely allocated to each terminal.

The storage unit 220 stores an address table including the terminal address and the port identification information detected by the information detector 210. In other words, the port identification information recognized as an input port by the information detector 210 is stored in association with a source address (i.e., a terminal address) of a received frame.

The reader 230 searches the address table based on a destination address of a received frame and reads port identification information from the address table. A port corresponding to the read port identification information is a main port or a sub port at which the terminal corresponding to the destination address of the received frame is presumed to exist.

The frame transformer 240 adds the port identification information read by the reader 230 to the received frame. The read port identification information may be recorded in the port identification information field 314 after the existing port identification information is removed from the port identification information field 314.

When port identification information corresponding to the destination address of the received frame does not exist in the address table, the frame transformer 240 adds broadcast information to the received frame so that the received frame is transmitted to all of the ports except for a sub port corresponding to the port from which the frame was received.

The output unit 250 outputs the frame transformed by the frame transformer 240 to a main port that is connected to a sub port corresponding to the port identification information read by the reader 230 among the main ports 501 through 508 of the Ethernet switch, each of which can be connected to at least one sub port. In addition, if a port corresponding to the port identification information read by the reader 230 is a main port, the output unit 250 outputs the frame without the port identification information.

Figure 3A:
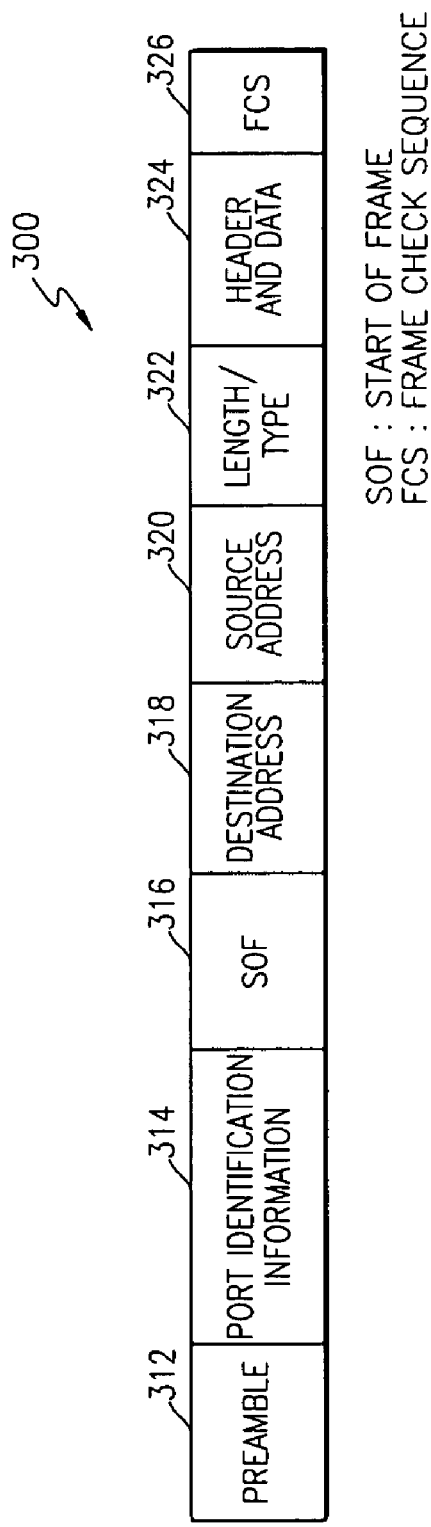
FIGS. 3A and 3B are diagrams of examples of an Ethernet frame according to the present invention.
Figure 3B:
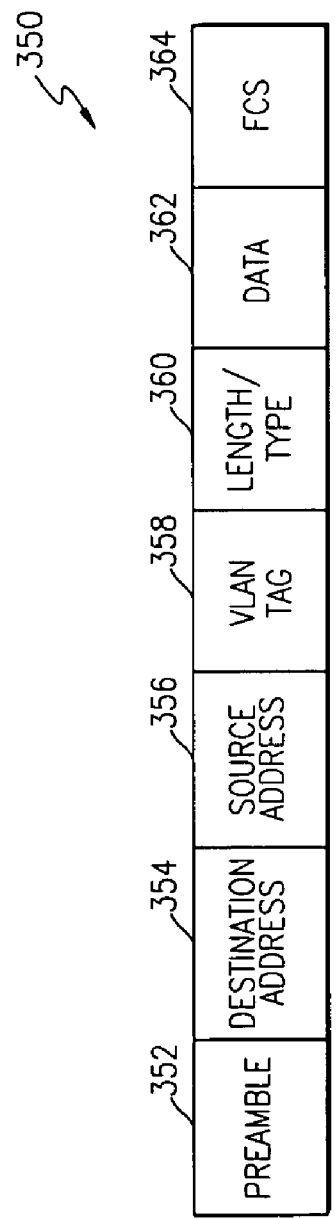

FIGS. 3A and 3B are diagrams of examples of an Ethernet frame according to the present invention. Referring to FIG. 3A, an expanded frame 300 includes a preamble field 312, a port identification information field 314, a start of frame (SOF) field 316, a destination address field 318, a source address field 320, a length/type field 322, a header and data field 324, and a frame check sequence (FCS) field 326.

The preamble field 312 informs the start of a frame. In the preamble field 312, 1 and 0 are alternately recorded. An address (i.e., a MAC address) of an equipment that will receive the frame is recorded in the destination address field 318. A MAC address of an equipment that generates the frame is recorded in the source address field 320. The frame shown in FIG. 3A has the same structure as a frame used in the EPON. Accordingly, when the frame shown in FIG. 3A is used, the EPON can be connected to the Ethernet switch without using an additional interface.

Referring to FIG. 3B, an Ethernet frame 350 includes a preamble field 352, a destination address field 354, a source address field 356, a virtual local area network (VLAN) tag field 358, a length/type field 360, a data field 362, and a FCS field 364. The VLAN tag field 358 is used to identify a virtual bridged LAN.

The structures of the frames 300 and 350 are just preferred embodiments. The frame structures can be changed according to communication protocols, and the position of a port identification information field may be changed.

Figure 4:
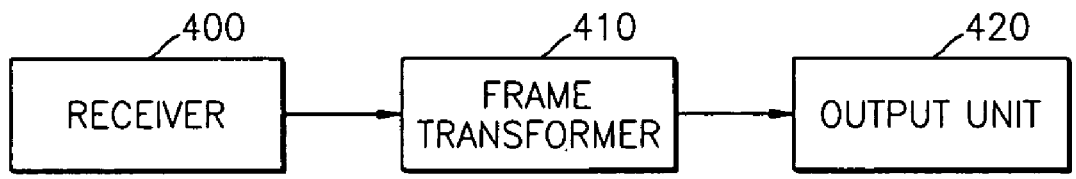
FIG. 4 is a block diagram of an apparatus for expanding a port according to an embodiment of the present invention.

FIG. 4 is a block diagram of an apparatus for expanding a port according to an embodiment of the present invention. Hereinafter, the apparatus for expanding a port is referred to as a port expanding apparatus for convenience.

Referring to FIG. 4, the port expanding apparatus includes a receiver 400, a frame transformer 410, and an output unit 420. The port expanding apparatus may include ports having a relationship of 1-to-many to perform multiplexing/demultiplexing or include ports having a relationship of 1-to-1 to be connected to an EPON.

The receiver 400 receives a first type of incoming frame which has no port identification information from one among plurality of ports connected to terminals or receives a second type of outgoing frame (300 shown in FIG. 3A) with port identification information from an Ethernet switch (500 shown in FIG. 5).

The frame transformer 410 adds port identification information to the first type of frame according to the sub-port's identification from which the frame was received. Port identification information of a port connected to a terminal may be a unique physical value of the port or a logical value temporarily allocated by a high-speed switch.

The output unit 420 outputs the first type of frame transformed by the frame transformer 410 to the Ethernet switch or outputs the second type of frame from which port identification information is removed to a port corresponding to the port identification information of the second type of frame. The port expanding apparatus shown in FIG. 4 can be included in an optical link terminal (OLT) of an EPON or may be separately connected to an OLT of an EPON.

FIG. 5 shows an example of a structure in which an Ethernet switch is connected to port expanding apparatuses, according to the present invention. Referring to FIG. 5, the Ethernet switch according to the present invention includes 8 main ports 501 through 508, and two main ports 505 and 508 are connected to sub ports. Expanding a port of the Ethernet switch 500 can be implemented by a port expanding apparatus 510 having a multiplexing/demultiplexing function and a plurality of sub ports 512 through 518 or by a port expanding apparatus 520, which includes ports having a relationship of 1-to-1, and an EPON.

Figure 6:
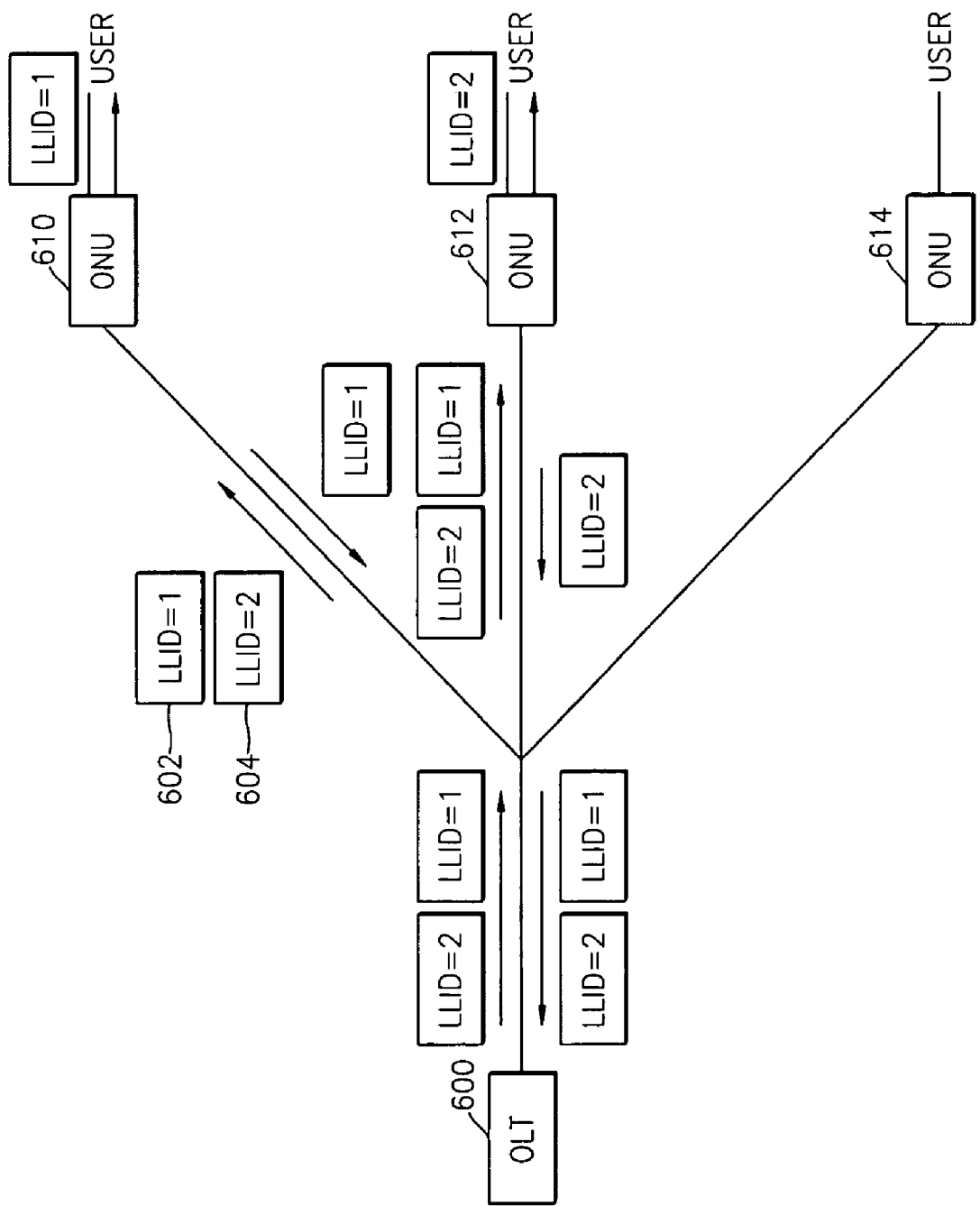
FIG. 6 is a diagram of an EPON connected to an Ethernet switch according to the present invention.

The EPON connected to the port expanding apparatus 520 is shown in FIG. 6. Referring to FIG. 6, the EPON includes an OLT 600 and ONUs 610, 612, and 614. A frame transmitted between the OLT 600 and the ONUs 610, 612, and 614 includes logical link identification (LLID) 602 or 604. A frame including the LLID 602 or 604 is connected to the Ethernet switch 500 shown in FIG. 5. The Ethernet switch 500 performs a switching operation based on MAC address and the LLID 602 or 604 included in the frame, thinking LLID as a sub-port ID. Each of the ONUs 610, 612, and 614 receives frames and passes only a frame corresponding to its own LLID to a user.

Referring back to FIG. 5, when the Ethernet switch 500 receives a frame (300 shown in FIG. 3A) including port identification information of one sub port, for example, the sub port 512, from which the frame has been received, an output port of the received frame may be another sub port, for example, the sub port 514, or a main port, for example, the first main port 501, which is not connected to any sub port, or may not be known.

When the output port of the frame is the sub port 514, the Ethernet switch 500 adds port identification information of the sub port 514, which is connected to a destination of the frame, to the frame and then outputs the frame to the fifth main port 505 connected to the sub port 514. The port expanding apparatus 510 outputs the frame to the sub port 514 corresponding to the port identification information of the frame.

When the output port of the frame is the first main port 501, the Ethernet switch 500 outputs the frame without adding port identification information. Here, the Ethernet switch 500 removes the port identification information included in the frame.

When the output port of the frame cannot be known, the Ethernet switch 500 adds broadcast information to the frame and then outputs the frame so that the frame is transmitted to all ports except for the sub port 512 from which the frame has been received. Here, the Ethernet switch 500 outputs the frame through all of the main ports 501 through 508 according to the flooding regulation. In response to the broadcast information, the port expanding apparatus 510 outputs the frame to all of the sub ports 514 through 518 except for the sub port 512 from which the frame has been received.

Next, when a frame is received through a main port, for example, the first main port 501, that is not connected to any sub port, an output port of the received frame may be the sub port 512, or another main port, for example, the second main port 502, which is not connected to any sub port, or may not be known.

When the output port of the frame is the sub port 512, the Ethernet switch 500 adds port identification information of the sub port 512 connected to a destination of the frame and then outputs the frame through the fifth main port 505. When the output port of the frame is the second main port 502 which is not connected to any sub port, the Ethernet switch 500 just outputs the frame without adding port identification information. When the output port of the frame cannot be known, the Ethernet switch 500 outputs through all of the main ports 502 through 508 except for the first main port 501 through which the frame has been received. Here, when the Ethernet switch 500 outputs the frame through the fifth and eight main ports 505 and 508, it adds broadcast information to the frame so that the frame can be transmitted to all of sub ports of the two main ports 505 and 508.

Figure 7:
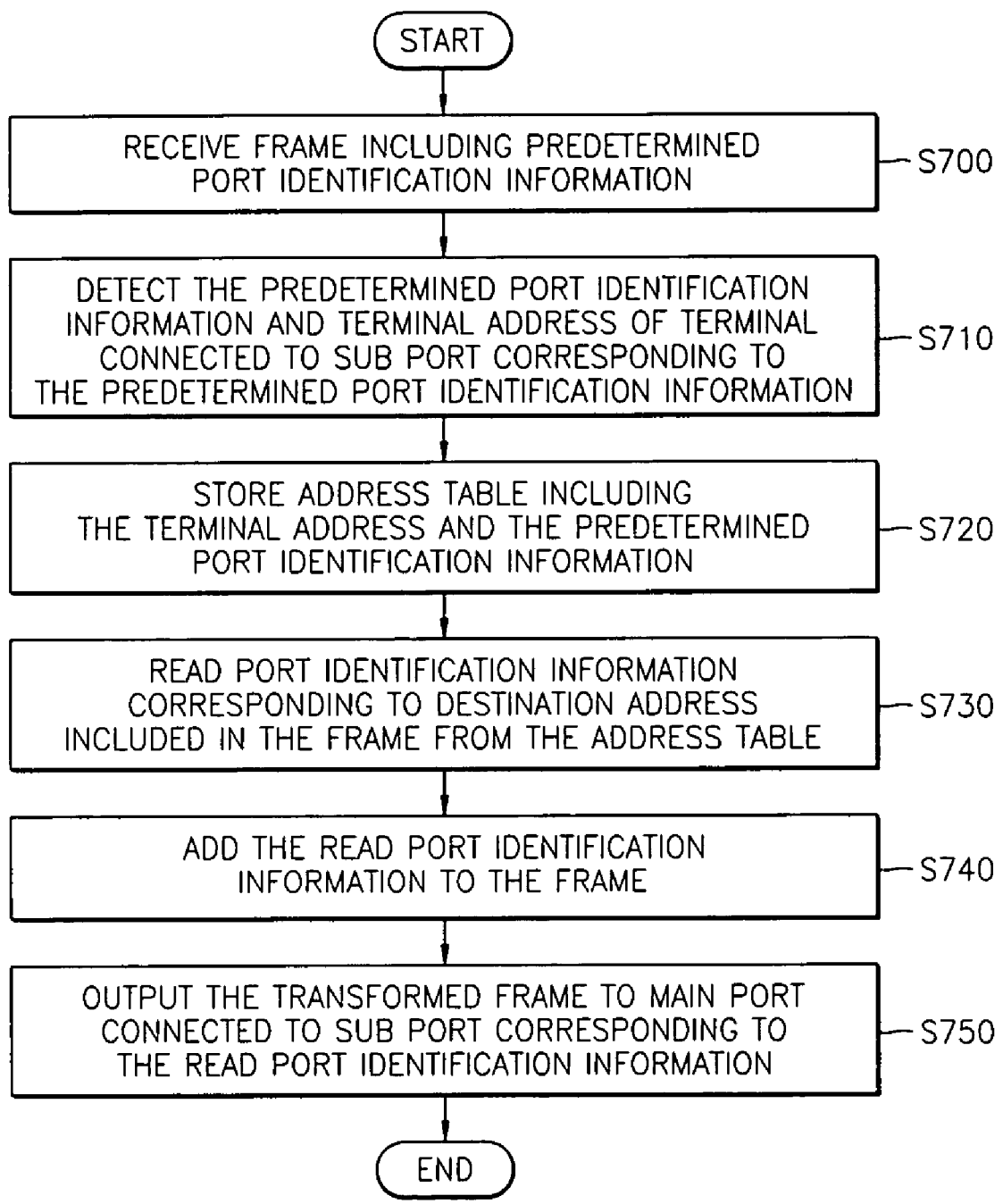
FIG. 7 is a flowchart of a method of expanding a port according to an embodiment of the present invention.

FIG. 7 is a flowchart of a method of expanding a port according to an embodiment of the present invention. The receiver 200 of an Ethernet switch receives a frame including predetermined port identification information in step S700. The information detector 210 detects the predetermined port identification information and a terminal address of a terminal, which is connected to a sub port corresponding to the predetermined port identification information included in the frame received by the receiver 200, in step S710.

The storage unit 220 stores an address table including the terminal address and the predetermined port identification information, which are detected by the information detector 210, in step S720. The reader 230 reads port identification information corresponding to a destination address included in the frame from the address table in step S730.

The frame transformer 240 adds the port identification information read by the reader 230 to the frame in step S740. The output unit 250 outputs the frame transformed by the frame transformer 240 to a main port, which is connected to a sub port to which the frame has to be delivered, among main ports that can be connected to at least one sub port in step S750.

Figure 8:
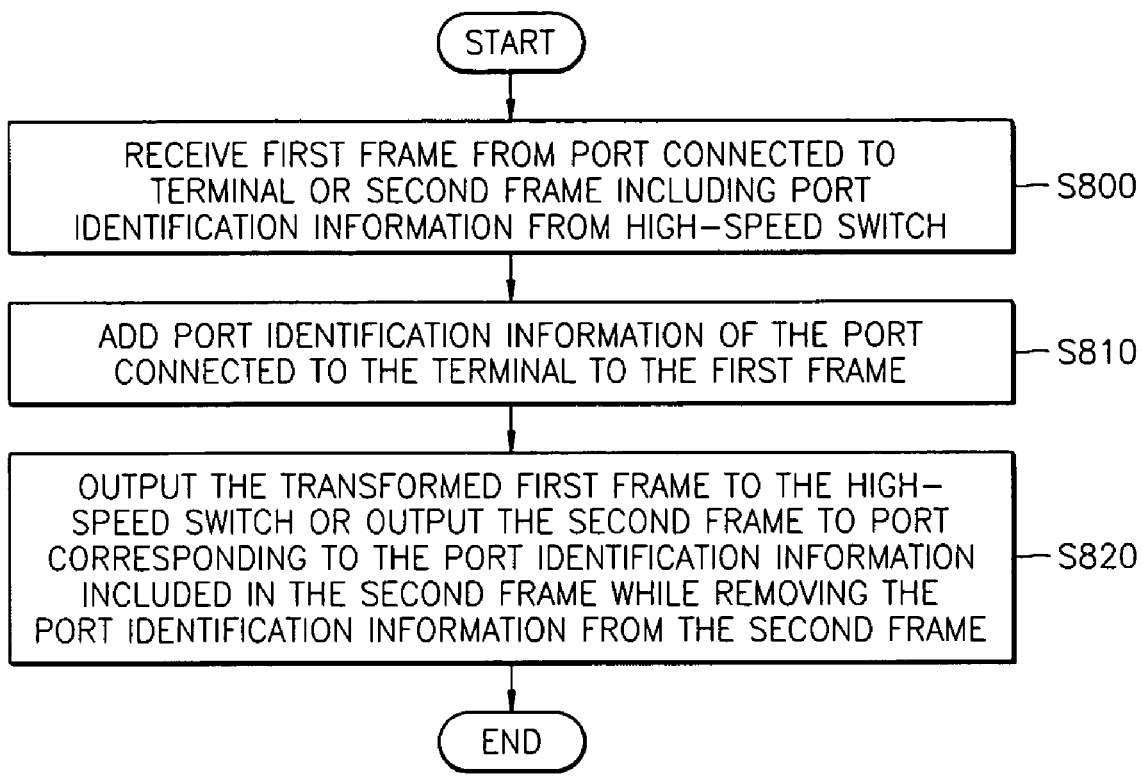
FIG. 8 is a flowchart of a method of expanding a port according to another embodiment of the present invention.

FIG. 8 is a flowchart of a method of expanding a port according to another embodiment of the present invention. The receiver 400 of a port expanding apparatus receives a first frame from a port connected to a terminal or a second frame including port identification information from a high-speed switch in step S800.

The frame transformer 410 adds port identification information of the port connected to the terminal, from which the first frame has been received, to the first frame in step S810.

The output unit 420 outputs the first frame transformed by the frame transformer 410 to the high-speed switch or outputs the second frame to a port corresponding to the port identification information included in the second frame while removing the port identification information from the second frame in step S820.

The present invention can be realized as a code which is recorded on a computer readable recording medium and can be read by a computer. The computer readable recording medium may be any type of medium on which data which can be read by a computer system can be recorded, for example, a ROM, a RAM, a CD-ROM, a magnetic tape, a hard disc, a floppy disc, a flash memory, or an optical data storage device. The present invention can also be realized as carrier waves (for example, transmitted through Internet). Alternatively, computer readable recording media are distributed among computer systems connected through a network so that the present invention can be realized as a code which is stored in the recording media and can be read and executed in the computers.

According to the present invention, since a plurality of low-speed ports are connected to a single high-speed switch (i.e., an Ethernet switch) without a bridge, the various functions and a large amount of memory of the high-speed switch can be shared, so that high performance can be achieved at a low cost. In addition, since the high-speed switch recognizes a physical port as a plurality of logical ports, it can perform a switching operation with respect to more ports while maintaining the same processing performance and port speed.

Although a few embodiments of the present invention have been shown and described, it will be appreciated by those skilled in the art that changes may be made in these elements without departing from the principles and spirit of the invention, the scope of which is defined in the appended claims and their equivalents.

What is claimed is:

1. An Ethernet switch comprising:
   a receiver which receives a frame including port identification information, the port identification representing the sub-ports belonging to the switch port;
   an information detector which detects the predetermined port identification information and a terminal address of a terminal connected to a sub port corresponding to the port identification information;
   a storage unit which stores an address table entry including the terminal address and the port identification information;
   a reader which reads port identification information corresponding to a destination address included in the frame from the address table;
   a frame transformer which adds the read port identification information to the frame; and
   an output unit which outputs the frame transformed by the frame transformer to a main port leading to the sub port corresponding to the read port identification information among main ports that can be connected to at least one sub port.

2. The Ethernet switch of claim 1, wherein the port identification information is either information of a sub port connected to a main port or the logical link Identification in an Ethernet Passive Optical Network.

3. The Ethernet switch of claim 1, wherein the port identification information is of the form of virtual LAN tag.

4. The Ethernet switch of claim 1, wherein when the port identification information corresponding to the destination address included in the frame does not exist in the address table, the frame transformer adds broadcast information to the frame so that the frame is transmitted to all ports except for the sub port corresponding to the predetermined port identification information included in the frame.

5. The Ethernet switch of claim 1, wherein the frame transformer adds the read port identification information to the frame when the frame is output to a main port connected to a sub port among a plurality of main ports.

6. A method of expanding a port comprising:
   receiving frames from each main port, the frame carrying sub-port information in a separate field outside the frame;
   detecting the received port and sub-port identification information together with the source MAC address;
   storing at the address table the source MAC address and the extracted port identification information, reading port identification information corresponding to the destination address included in the frame from the address table, wherein the port identification information is either information of a sub port connected to a main port or the logical link Identification in an Ethernet Passive Optical Network;
   adding the read port identification information to the frame; and
   outputting the frame with the read port identification information to the main port connected to a sub port corresponding to the read port identification information, among main ports that can be connected to at least one sub port.

7. The method of claim 6, wherein the port identification information is of the form of virtual LAN tag.

8. The method of claim 6, wherein adding the read port identification information to the frame comprises adding broadcast information to the frame when the port identification information corresponding to the destination address included in the frame does not exist in the address table so that the frame is transmitted to all ports except for the sub port corresponding to the predetermined port identification information included in the frame.

9. The method of claim 6, wherein adding the read port identification information to the frame is performed when the frame is output to a main port connected to a sub port among a plurality of main ports.

10. An apparatus for expanding a port, comprising: a receiver which receives a first incoming frame from a port connected to terminals or receives a second outgoing frame including port identification information from the port connected to high-speed switch; a frame transformer which adds to the first frame the port identification information of the port from which the first frame has been received; and an output unit which outputs the first incoming frame transformed by the frame transformer to the high-speed switch or outputs the second outgoing frame to the port corresponding to the port identification information included in the second frame.

11. The apparatus of claim 10, wherein the port identification information included in the second frame can indicate using a flag bit the broadcast information enabling the second frame to be output to all ports except for a port from which the second frame has been received.

12. The apparatus of claim 10, wherein the port identification information is the logical link Identification of an optical network unit in an Ethernet Passive Optical Network.

13. The apparatus of claim 10, wherein the port identification information is the virtual local area network tag.

14. A method of expanding a port, comprising: receiving a first incoming frame from a port connected to a terminal or receives a second outgoing frame including port identification information from a port connected to high-speed switch; adding to the first frame the port identification information of the port from which the first frame has been received; and outputting the first incoming frame transformed by the frame transformer to the high-speed switch or outputs the second outgoing frame to the port corresponding to the port identification information included in the second frame.

15. The method of claim 14, wherein the port identification information included in the second frame can indicate using a flag bit the broadcast information enabling the second frame to be output to all ports except for a port from which the second frame has been received.

16. The method of claim 14, wherein the port identification information is the logical link Identification of an optical network unit in an Ethernet Passive Optical Network.

17. The method of claim 14, wherein the port identification information is the virtual local area network tag.

* * * * *